United States Patent [19]

Anderson

[11] 4,347,908

[45] Sep. 7, 1982

[54] APPARATUS FOR TRAVERSING A TERRAIN IN A PREDETERMINED PATTERN

[76] Inventor: Ronald L. Anderson, 9034 Marlive, Houston, Tex. 77025

[21] Appl. No.: 112,941

[22] Filed: Jan. 17, 1980

[51] Int. Cl.³ .............................................. B62D 1/00
[52] U.S. Cl. .................................... 180/131; 56/10.2; 56/DIG. 15
[58] Field of Search .............. 180/131, 79; 56/DIG. 3, 56/DIG. 15, DIG. 9, 10.2, 255, 295; 239/190, 186, 188, 184, 711, 191

[56] References Cited

U.S. PATENT DOCUMENTS 3,052,076  9/1962  Bambi ................................. 180/131
3,258,082  6/1966  Amos et al. .......................... 180/131

*Primary Examiner*—Robert R. Song
*Attorney, Agent, or Firm*—Marvin B. Eickenroht; Frank S. Vaden, III

[57] ABSTRACT

Apparatus is disclosed in which a self-propelled vehicle is caused to traverse a terrain by following a line arranged over the terrain in a predetermined manner, and means are provided for normally holding the line in a position close to terrain and thus out of the way of persons and objects in and around the terrain.

18 Claims, 4 Drawing Figures

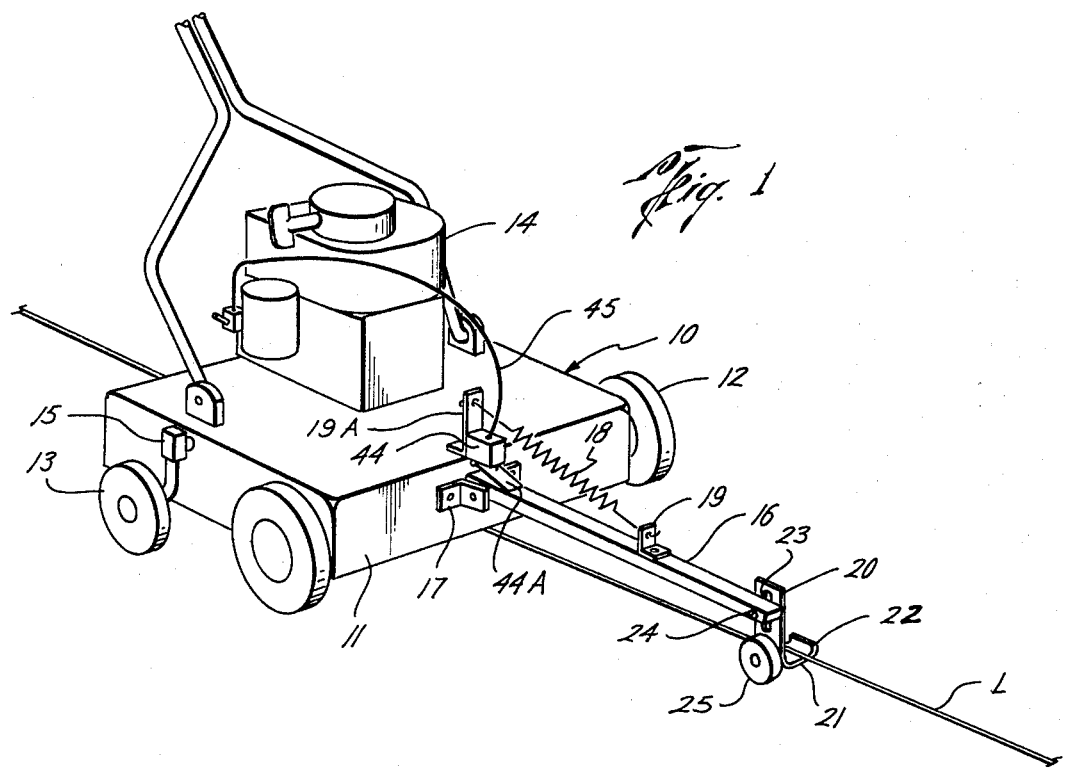
Fig. 1
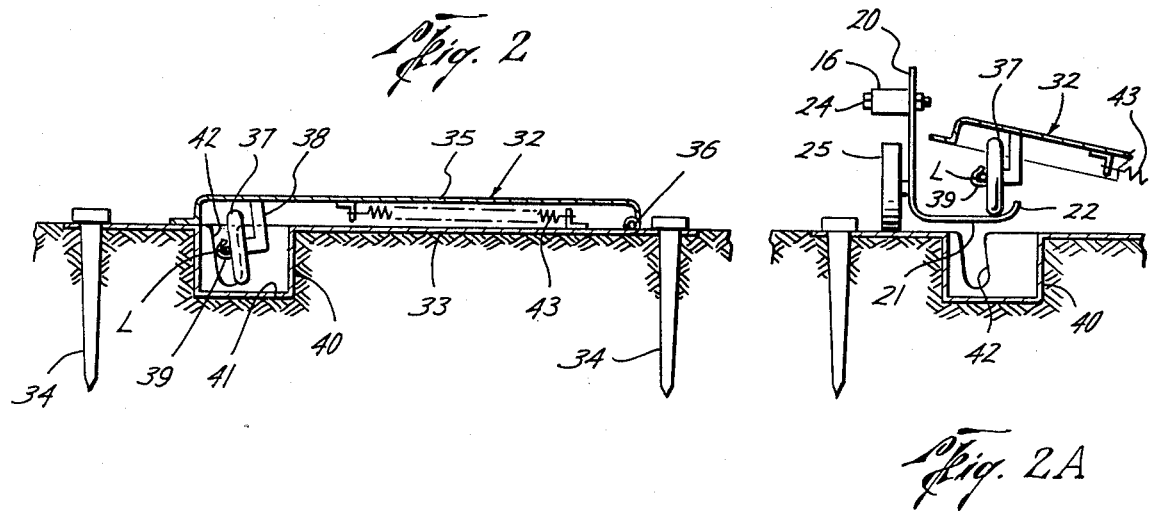
Fig. 2
Fig. 2A
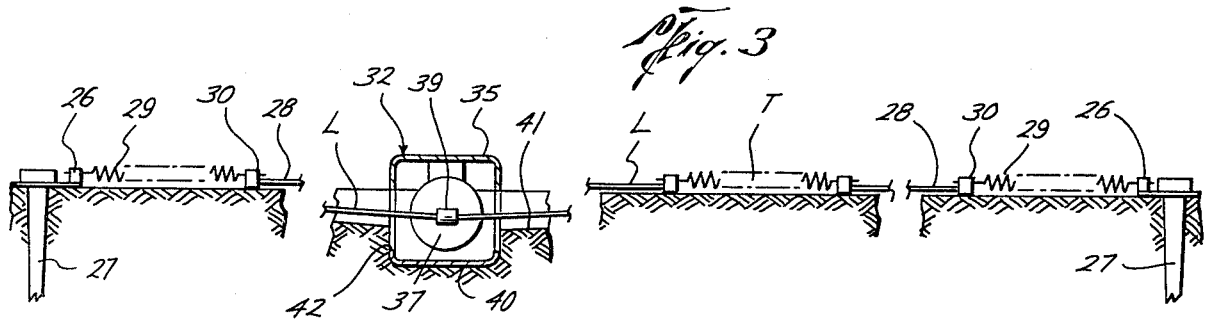
Fig. 3

APPARATUS FOR TRAVERSING A TERRAIN IN A PREDETERMINED PATTERN

This invention relates to apparatus in which a self-propelled vehicle is caused to traverse a terrain by following a line arranged over the terrain in a predetermined pattern. In one of its aspects, this invention relates to a system by which an existing self-propelled vehicle may be adapted to so traverse a terrain.

The apparatus or system of this invention is especially useful and therefore disclosed in connection with the mowing of lawns, although it may also be used for other purposes, as in the plowing of snow, spreading of fertilizer or other agricultural activity. In any of these environments, the line to be followed may present a problem if raised sufficiently far above the terrain that a person might trip over it or an object might damage it or be damaged by it while moving over the terrain.

It is therefore the primary object of this invention to provide an apparatus or system in which the line to be followed by the vehicle is normally held in a position close to the terrain and thus out of the way of persons and objects in and around the terrain to be traversed.

Another object is to provide such an apparatus or system in which the vehicle is prevented from moving out of control in the event of a break in the line, and, more particularly, in the event it is broken, the line may be easily and quickly repaired.

A further object is to provide such an apparatus or system in which the line may be easily and quickly installed in the desired pattern.

Yet another object is to provide such an apparatus or system which is of such construction that its cost does not greatly exceed that of a conventional self-propelled vehicle having no facility for traversing a terrain in a predetermined pattern.

A still further object is to provide such a system which is easily, quickly and inexpensively adaptable to an existing self-propelled vehicle.

These and other objects are accomplished, in accordance with the illustrated embodiment of the invention, by a line which, when arranged over the terrain in the desired pattern, may have its opposite ends anchored thereto so as to hold it tautly in that pattern, and intermediate portions thereof attached to additional anchors which yieldably urge the line downwardly to a position close to the terrain. A follower means attached to the vehicle is adapted to move beneath and along the line so as to guide the vehicle in the predetermined pattern as it moves over the terrain, and since the means by which it is urged downwardly to a position close to the terrain is yieldable, the line may be lifted as the follower means moves beneath it, and then automatically returned to its position close to the terrain as the follower means advances further along the line. As previously mentioned, the follower means may be attached to an existing self-propelled vehicle, or be part of a vehicle to be supplied along with the line beneath and along which the follower means on the vehicle moves.

In the preferred and illustrated embodiment of the invention, a means is provided for interrupting the power by which the vehicle is self-propelled automatically in response to a break in the line, so that the vehicle will stop before it is permitted to move out of control and thus damage persons or things or objects. More particularly, the means for interrupting the power comprises a switch on the vehicle which is connected to the power source, and means on the follower means for moving the switch to power-interrupting position when the line breaks.

Thus, the follower means comprises an arm which has one end connected to the vehicle for swinging about an axis generally parallel to the terrain, and a bracket on the other end of the arm having a laterally extending flange adapted to slide beneath and along the line. A tension spring is connected at one end of the arm intermediate its ends and at the other end to the vehicle so as to raise the other end of the arm, and thus maintain the follower means tightly against the line, and a roller is mounted on the bracket for moving over the terrain. Preferably, means are provided for adjusting the bracket, thus the roller mounted on it, vertically with respect to the other end of the arm, and thus with respect to the flange extending therefrom. A switch mounted on the vehicle is electrically connected to the power source so as to interrupt power when moved from a first to a second position, and means are provided on the arm for so moving the switch when the other end of the arm is raised, as, for example, in the event the line breaks.

The means by which intermediate portions of the line are urged to downwardly includes at least one device having a base adapted to be anchored to the terrain, a part attachable to the intermediate portion of the line, and means mounting the part on the base for vertical movement between a lower position beneath the terrain and an upper position above the terrain. The attachment part is urged to its lower position by a spring which is yieldable to permit such part to be raised to its upper position as the follower means passes beneath the intermediate portion of the line. Depending on the length of the line, there may be a plurality of intermediate anchoring devices spaced along it intermediate its opposite ends.

As disclosed in the preferred embodiment of the invention, the line includes longitudinally separated segments, and tension springs releasably connected to the opposite ends of adjacent segments. This not only permits a desired amount of tension to be placed in the line in order to hold it tautly in the desired pattern, but also permits repair of the line in the event it breaks by merely replacing the segment or spring at which the break occurs.

In the drawings, wherein like reference characters are used throughout to designate like parts:

FIG. 1 is a perspective view of an apparatus or system having a self-propelled lawnmower and a line constructed and arranged in accordance with the present invention, to cause such mower to move in a predetermined pattern;

FIG. 2 is an enlarged cross-sectional view of a device for yieldably urging an intermediate portion of the line downwardly to a position close to the terrain;

FIG. 2A is a cross-sectional view similar to FIG. 2, but showing the follower part of the lawnmower as it moves beneath the line and roller of the device of FIG. 2; and FIG. 3 is a longitudinal sectional side view of the line, broken away at spaced locations along its length for purposes of illustration, and including a cross-sectional view of the device shown in FIG. 2.

With reference now to the details of the above-described drawings, the lawnmower shown in FIG. 1, and indicated in its entirety by reference character 10, comprises a platform 11 on which front and rear set of wheels 12 and 13, respectively, are mounted for traversing a terrain. The front wheels, as well as the cutting blades beneath and within the platform, are driven by a motor 14, which may be gasoline powered, although the invention contemplates that the lawnmower or other vehicle may be propelled by another type of power source. In any event, the rear wheels 13 are mounted on axles which have upstanding arms received within journals 15 to permit them to swivel and thus facilitate turning of the mower in accordance with the pattern it is to follow.

An arm 16 extends longitudinally from the front of the mower platform and is pivotally connected to a bracket 17 thereon for swinging about an axis generally parallel to the terrain so that its outer end may move vertically for purposes to be described. The outer end of the arm is normally urged upwardly by means of a tension spring 18 which is connected between a bracket 10 on the topside of the arm intermediate its inner and outer ends and a bracket 19A mounted on the topside of the mower platform 11.

As previously mentioned, the means for causing the self-propelled mower to follow the line L, which has been arranged over the terrain, as will be described to follow, is mounted on the outer end of the arm, and comprises a bracket 20 having a laterally extending flange 21 whose outer end 22 is bent upwardly. Thus, as shown, during forward movement of the mower 10, the bracket 20 slides beneath and along the line L which is held tautly by anchoring means to be described. Due to the tension applied by spring 18, the topside of bracket 20 is normally held tightly against the lower edge of the line L. The bracket preferably has a vertical slot 23 formed therein which receives a bolt 24 mounted on the upper, outer end of the arm so as to permit the bracket to be adjusted vertically with respect to the arm. Also, a roller 25 is rotatably mounted on the side of the bracket opposite the laterally extending flange 21 so as to engage the terrain beneath the flange 21 (see FIG. 2A) and thus hold the bracket a slight distance above the terrain as it follows the line L. This is intended to prevent the bracket from being hung up on minor obstructions which might exist on the terrain in and around the pattern in which the line L is arranged.

As shown in FIG. 3, the opposite ends 26 of the line L receive stakes 27 which are driven into the terrain T. More particularly, the line L includes segments 28 whose opposite ends are connected to the opposite ends of adjacent segments and to the ends 26 of the line L by means of tension springs 29. Each of these connections is preferably a quick releasable clip 30 of any suitable type. Thus, the line L is held tautly between the end stakes 27 in a position which is at least close to the terrain T and thus normally out of the way of persons or objects in and around the terrain. As previously mentioned, the releasable connections between the ends of the segments and springs permits a broken segment or spring to be replaced in order to repair the line L.

Intermediate portions of the line L are yieldably urged downwardly by anchoring devices each of which includes a case 32 having a bottom portion 33 which is anchored to the terrain on opposite sides of the intermediate portion of the line L by means of stakes 34, and a top portion 35 which is pivotally connected to the lower portion at one end thereof by means of a pin 36. A roller 37 is carried on the upper portion 35 of the container 32 by means of an arm 38, and a clip 39 attached to the outer side of the roller is adapted to releasably receive the intermediate portion of the line L. As shown in FIG. 2, when the upper portion of the container is moved downwardly the roller 37 and its clip 39 are received within a depression 40 in bottom portion 33 of case 32. The depression is in turn received within a sunken portion of a relatively shallow trench 41 formed in the terrain beneath the line. As can be seen from FIGS. 2 and 3, the upper portion 35 of the container 32 extends above the terrain to a level not substantially higher than portions of the line L extending between the intermediate anchoring devices.

Prior to movement of the follower part on the vehicle beneath the intermediate portion of the line to which the above-described device is attached, the line L will extend through slots 42 formed in opposite sides of the lower portion 33 of the container, as can be seen from FIGS. 2 and 3. The upper portion 35 of the container 32 is normally urged to its lower position of FIGS. 2 and 3 by means of a tension spring 43 extending between brackets on the lower side of the upper portion and upper side of the lower portion of the container. This then serves to yieldably urge such intermediate portion of the line to which the part 39 is connected downwardly to a position close to the terrain.

As the follower means on the vehicle approaches one of the above-described devices, the bracket 20 thereof will gradually lift the line L extending into the trench 41 on the forward side of the container 32. This then will raise the upper portion of the container and thus the roller 37 on which part 39 is carried so as to raise the line and roller to the position of FIG. 2A as the bracket moves beneath them. This raising of the line and roller is permitted by yielding of the spring 43 which, however, upon movement of the follower means past the roller and intermediate portion of the line, will urge the roller and line to move back to the position of FIG. 2 as the upper portion of the container returns to its lowered position.

A switch 44 is mounted on the front side of bracket 20 of the mower carriage just above the inner end of arm 16. The switch is connected to a kill line 45, extending to the motor 14, and, as well known in the art, adapted to permit the supply of power to the mower to be interrupted. The switch will occupy a first position in which it does not function to interrupt the supply of power to the engine. However, if the outer end of the arm is raised by means of the tension spring 18, a leaf spring 45 on the top side of its inner end will move into engagement with a contact (not shown) on the bottom side of switch 44 to move it to a second position in which it interrupts such power through the kill line 45.

Consequently, in the event the line L breaks, the power is shut off so that the lawnmower will stop and thus not move out of control. It will also be appreciated that since the outer end of the arm is raised before the follower means is moved into position beneath the prearranged, taut line L, the mower cannot be started, thereby preventing it from being accidentally started before positioned for following the pattern of the line L.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations.

This is contemplated by and is within the scope of the claims.

As many possible embodiments may be made of the invention without departing from the scope thereof, it it to be understood that all matter herein set forth or shown in the accompanying drawings is to be interpreted as illustrative and not in a limiting sense.

The invention having been described, what is claimed is:

1. Apparatus for traversing a terrain in a predetermined pattern, comprising a self-propelled vehicle, a line adapted to be arranged over the terrain in the desired pattern, means for anchoring the opposite ends of the line to the terrain to hold it tautly when so arranged, means adapted to be anchored to the terrain for yieldably urging intermediate portions of the line downwardly to a position close to the terrain, and upwardly biased follower means attached to the vehicle and having a laterally extending flange which is slidably engageable with the bottom portion of the line, for moving beneath and along the line so as to guide said vehicle in said pattern as it moves over the terrain, and means responsive to upward movement of the follower means relative to the vehicle, in the event of a break in the line, for interrupting the power by which the vehicle is self propelled.

2. Apparatus of the character defined in claim 1, wherein said power interrupting means comprises a switch on the vehicle for connection to the power source, and means on the follower means for moving the switch to power interrupting position when the line breaks.

3. Apparatus of the character defined in claim 1, wherein the means for urging intermediate portions of the line downwardly includes at least one device having a base adapted to be anchored to the terrain, a part attachable to such intermediate portion of the line, means mounting the part on the base for vertical movement between a lowered position beneath the terrain and an upper position above the terrain, and means urging said part to its lowered position but yieldable to permit the part to be raised to its upper position as the flange of the follower means passes beneath such intermediate portion of the line.

4. Apparatus of the character defined in claim 3, wherein there are a plurality of intermediate anchoring devices spaced along the line intermediate its opposite ends.

5. Apparatus of the character defined in claim 3, wherein the part of each device which is attachable to the line includes a roller, the means mounting such roller is an arm connected to the base for pivoting about an axis generally parallel to the terrain, and the flange of the follower means is adapted to slide beneath the roller.

6. Apparatus of the character defined in claim 1, wherein the line includes longitudinally separated segments, and tension springs releasably connected to the opposite ends of adjacent segments.

7. Apparatus of the character defined in claim 1, wherein said follower means comprises an arm having one end connected to the vehicle for swinging about an axis generally parallel to the terrain, a bracket on the other end of the arm having the laterally extending flange adapted to slide beneath and along the line, a tension spring connected at one end to the arm intermediate its ends and at the other end to the vehicle so as to raise said other end of the arm, and a roller on the bracket for moving over the terrain in order to hold the flange and thus the line a short distance above the terrain.

8. Apparatus of the character defined in claim 7, including means for adjusting the bracket vertically with respect to the other end of the arm.

9. Apparatus of the character defined in claim 7, including a switch mounted on the vehicle and electrically connected to the power source so as to interrupt power when moved from a first to a second position, and means on the arm for so moving the switch when the other end of the arm is raised.

10. A system for causing a self-propelled vehicle to traverse a terrain in a predetermined pattern, comprising a line adapted to be arranged over the terrain in the desired pattern, means anchoring the opposite ends of the line to the terrain when so arranged, means adapted to be anchored to the terrain for yieldably urging the line downwardly to a position close to the terrain intermediate its end, upwardly biased follower means attachable to the vehicle and having a laterally extending flange which is slidably engageable with the bottom portion of the line for moving beneath and along the line so as to guide said vehicle in said pattern as it moves over the terrain, and means responsive to upward movement of the follower means relative to the vehicle, in the event of a break in the line, for interrupting the power by which the vehicle is self propelled.

11. A system of the character defined in claim 10, wherein said power interrupting means comprises a switch for connection to the power source, and means on the follower means for moving the switch to power interrupting position when the line breaks.

12. A system of the character defined in claim 10, wherein the means for urging intermediate portions of the line downwardly includes at least one device having a base adapted to be anchored to the terrain, a part attachable to such intermediate portion of the line, means mounting the part on the base for vertical movement between a lowered position beneath the terrain and an upper position above the terrain, and means urging said part to its lowered position but yieldable to permit the part to be raised to its upper position as the flange of the follower means passes beneath such intermediate portion of the line.

13. A system of the character defined in claim 12, wherein there are a plurality of intermediate anchoring devices spaced along the line intermediate its opposite ends.

14. A system of the character defined in claim 11, wherein the part of each device which is attachable to the line includes a roller, the means mounting such roller is an arm connected to the base for pivoting about an axis generally parallel to the terrain, and the flange of the follower means is adapted to slide beneath the roller.

15. A system of the character defined in claim 10, wherein the line includes longitudinally separated segments, and tension springs releasably connected to the opposite ends of adjacent segments.

16. A system of the character defined in claim 10, wherein said follower means comprises an arm having one end adapted to be connected to the vehicle for swinging about an axis generally parallel to the terrain, a bracket on the other end of the arm having the laterally extending flange adapted to slide beneath and along the line, a tension spring connected at one end to the arm intermediate its ends and having means on the other end for connection to the vehicle so as to raise said other end of the arm, and a roller on the bracket for moving over the terrain in order to hold the flange and thus the line a short distance above the terrain.

17. A system of the character defined in claim 16, including means for adjusting the bracket vertically with respect to the other end of the arm.

18. A system of the character defined in claim 16, including a switch adapted to be mounted on the vehicle and to be electrically connected to the power source so as to interrupt power when moved from a first to a second position, and means on the arm for so moving the switch when the other end of the arm is raised.

* * * * *